United States Patent [19]

Hirsch et al.

[11] 4,442,601

[45] Apr. 17, 1984

[54] TOOL HANDLE

[75] Inventors: Gustav M. Hirsch, Nahariya; Moshe Bar-Nof, Shlomi, both of Israel

[73] Assignee: Noga Engineering Ltd., Shlomi, Israel

[21] Appl. No.: 345,137

[22] Filed: Feb. 2, 1982

[30] Foreign Application Priority Data

Feb. 12, 1981 [IL] Israel .................................... 62120

[51] Int. Cl.³ ............................................... B23D 79/08
[52] U.S. Cl. ........................................ 30/169; 279/30; 30/317
[58] Field of Search ................. 30/169, 339, 338, 317; 279/24, 30, 103

[56] References Cited

U.S. PATENT DOCUMENTS

| 1,814,655 | 7/1931 | Andreasson | 279/24 X |
| 2,451,922 | 10/1948 | Cox | 279/103 |
| 3,787,972 | 1/1974 | Carossino | 30/317 |

Primary Examiner—Jimmy C. Peters
Attorney, Agent, or Firm—Browdy and Neimark

[57] ABSTRACT

A handle for swivelling tools, aperture means within the handle for receiving the stock swivelling of the tool, and internal retaining means for retaining said tool within said handle. A preferred embodiment of the invention enables the insertion or removal of the tool only when the tool is rotated relative to the handle in a first direction. When the tool is used for its tool purposes it swivels or rotates in the second direction and accordingly is retained within the handle.

3 Claims, 6 Drawing Figures

TOOL HANDLE

This invention is concerned with handles for tools and more particularly with such handles for hand operated tools, such as deburring tools.

The handles for the deburring tools described herein are improvements over a hand-held holder for a deburring tool invented by Mr. Roth many years ago and described in U.S. Pat. Ser. No. 2,598,443 issued in the United States on Apr. 7, 1947. The patented deburring tool has a sharpened blade end that is designed to swivel within a handle. The tool was not securely held in the handle. The Roth device was subsequently improved.

In the improved device the stock of the deburring tool is spaced apart from the sharpened deburring end and has a peripheral notch therein. The handle has an axially extending aperture at one end. The stock of the tool fits into the aperture and a spheroid is held against the peripheral notch by an external spring operated ball retaining member. When the ball retaining member is moved away from the ball, the ball moves from the notch sufficiently to enable either removal of the stock of the tool or insertion of the stock of the tool within the handle.

The retaining arrangement shown in the above-mentioned U.S. patent served its purpose for many years. However, it is relatively expensive, complicated and proves relatively cumbersome in that it is externally placed on the handle. Thus a handle with the entire retaining means substantially within the handle has long been desired by purchasers and users of the tools.

It is an object of the present invention to provide new and improved handles for tools in which the above referred to disadvantages are substantially reduced or overcome.

According to the present invention a handle for a tool is provided, said handle comprising:

axial aperture means within said handle for receiving the stock of said tool, retaining means for retaining said stock within said handle, said retaining means having a retaining position and a releasd position, spring means keeping said retaining means normally in said retaining position, and said retaining means being substantially within said handle.

Another aspect of the invention places the spring means inside the handle in addition to the retaining means. Yet another feature of the invention is to provide means whereby said retaining means is moved from the normal retaining position to the release position responsive only to rotation of said tool means relative to said handle in a first direction. Other embodiments of the invention require pressing a protruding portion of the retaining means toward the axis of said handle to move the retaining means from the retaining position to the release position.

The operation and utilization of the present invention will become more fully apparent from the description of a preferred embodiment taken in conjunction with the accompanying drawings, in which.

Figure 1:
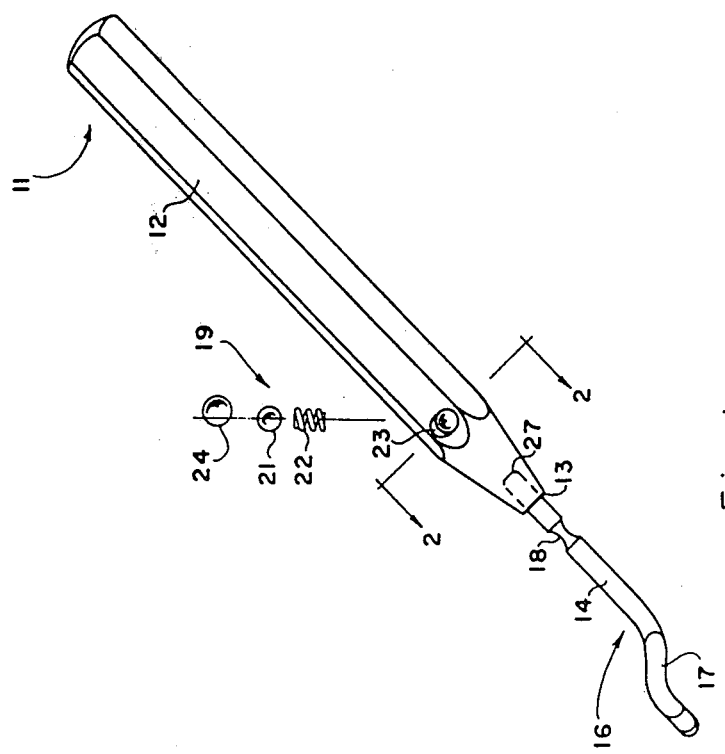
FIG. 1 is an exploded pictorial showing of one embodiment of the inventive holder for a swivelling tool.

The handle and tool assembly 11 of FIG. 1 features an elongated hexagonally shaped handle 12. The handle 12 has an axial aperture 13 at one end for receiving therein the stock 14 of a tool 16. The tool in the embodiment shown is a swivelling type deburring tool. The sharpened blade portion 17 is pressed against the periphery of the item being deburred and as the tool handle is moved in a rotating motion around the periphery of the device the blade accomplishes the deburring as the tool 16 swivels within the handle. The stock 14 of the tool has a peripheral notch 18 therein. The notch receives the retaining means which locks the tool stock within the handle.

Figure 2:
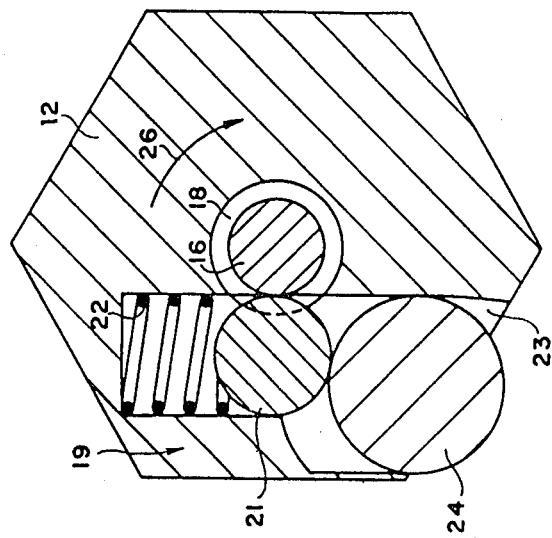
FIG. 2 is a sectional view of the tool holder of FIG. 1 on a plane perpendicular to the axis of the handle and going through the tool retaining aperture with the tool and retaining means in place.

It should be understood that while the hexagonally shaped handle is shown the handle could easily be round, square or any of many different shapes. The showing of the assembly 11 in FIG. 2 is a sectional view taken through the plane 2—2 and looking in the direction of the arrows. Therein the handle 12 is shown as having the axial aperture therein with the tool 16 in place.

The retaining means 19 comprises a notch entering element shown as sphere 21. A resilient element for normally retaining the entering element 21 within the notch is shown as spring 22. Means for maintaining the retaining means within the retaining means aperture 23 is shown in FIG. 1 and 2 as sphere 24. Sphere 24 it should be noted is shown as having its centre slightly removed from the centre of sphere 21 and the longitudinal axis of spring 22. The retaining means aperture 23 is shown as being transverse to the tool receiving aperture 13 in FIGS. 1 and 2.

As assembled in FIG. 2 it is seen that sphere 24 is held in the aperture 23 by peening the ends of the aperture 23 over the sphere 24. In the normal position, the spring 22 presses the sphere 21 against the sphere 24. In that position the sphere 21 is held within the notch 18 of the swivelling tool 16. A unique feature of this invention is that when the tool 16 is turned in the clockwise direction in the configuration of FIG. 2, that is in the direction of the arrows 26, then the sphere 24 is forced out of the notch 18 on the tool 16. Then the retaining means is in the release position and the tool can readily be removed or inserted.

Thus, by turning the tool in the direction of the arrow 12 and at the same time pulling the tool away from the interior of the axial aperture 13 the tool 16 is removed. Similarly the tool can be returned to its retained position in the handle by rotating the tool in the direction of the arrow 26 while pushing the top of the tool 27 against the sphere 21. This removes the sphere out of the notch, compresses spring 22 As soon as the tool is no longer turning relative to the handle in the direction of the arrow 26 then the sphere 21 slips into the notch 18 and locks the tool in place.

In use the tool swivels in a direction opposite to the direction of arrow 26. The sphere 21 is then forced against sphere 24 and cannot be moved from the notch and the tool remains locked in place by the sphere in the notch. Thus the tool is normally in the retained position and the release position is obtained by rotating the tool in the direction of the arrow 26 relative to the handle 12.

Figure 3:
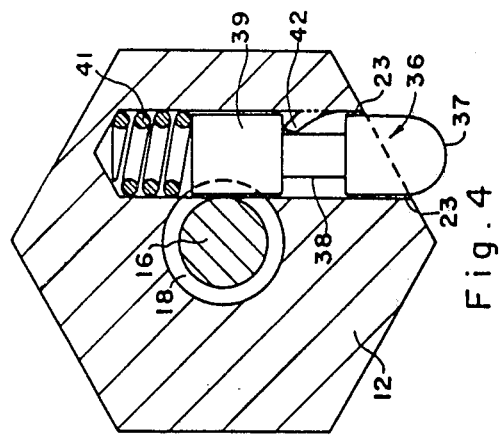
FIG. 3 is a sectional view in the same plane of another embodiment of the inventive tool holder.

FIG. 3 is a cross-sectional view on the same plane 2—2 showing another embodiment of the invention. Here again the handle 12 is shown with the tool 16 in place. Normally sitting in the notch 18 is a sphere 31. The sphere 31 is held in the notch by a spring 32 which is on the open side of the retaining means aperture 23. The retaining means aperture is plugged with plug 33. Thus there is no part of the retaining means in the embodiment of FIG. 3 external to the retaining means aperture 23.

The retaining means is moved to the release position by rotating the tool in the direction of the arrow 34 in the configuration of FIG. 3. Rotating the tool in the direction of the arrow 34 moves the retaining means sphere 31 against the force of spring 32 out of the notch. As soon as the tool stops rotating, the notch is once again aligned with the sphere, then the tool is automatically in the retained position. It should be noted that the direction of the arrows 34 and 26 is the same. During its actual deburring operation use the tool swivels or rotates opposite to the direction of the arrows 34 and 26.

Figure 4:
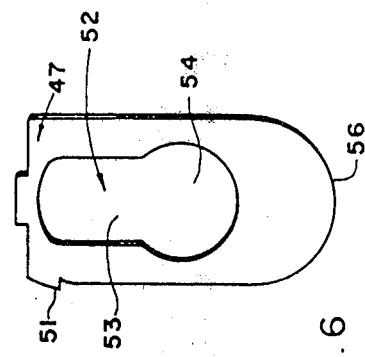
FIG. 4 is a sectional view of yet another embodiment of the inventive tool holder taken on the same plane as the prior sectional views.

FIG. 4 is a sectional view taken on plane 2—2 showing yet another embodiment of the invention. Here again the handle 12 is shown with the tool 16 in place. In this embodiment, in the retaining means aperture 23 there is an elongated notched cylindrical retaining means generally shown as 36. The retaining means is shown as comprising an externally extending bullet shaped end 37, a cylindrical notched mid-section 38 and an internal cylindrical end section 39. A spring 41 normally forces the retaining means 36 against a detent 42 within the aperture 23. This holds the internal cylindrical section 39 of the retaining means 36 within the notch 18 of the tool 16. The cylindrical notch 38 has a smaller diameter than the internal cylindrical section 39. Normally the section 39 retains the tool in the handle. The release position is obtained by applying pressure on bullet like end 37 of retaining means 36 to force it in the axial direction. This forces the retaining means 36 against the spring member 41 until the notch 18 of the tool 16 is aligned with the cylindrical notch 38 in the retaining means releasing or inserting the tool.

Figure 5:
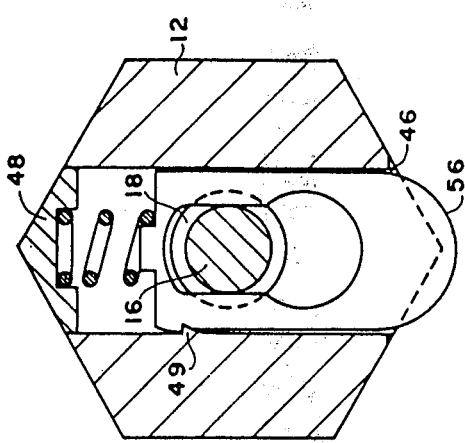
FIG. 5 is a sectional view of yet another embodiment taken on the same plane as in FIGS. 2, 3 and 4.

FIG. 5 is another embodiment of the inventive handle for a swivelling tool. In this embodiment the tool handle 12 is shown as having a centrally disposed transverse slot 46 therein. Placed within the slot is the key hole bearing retaining member 47. A spring means 48 holds the retaining member 47 in a position locking the tool 16 within the tool handle 12.

Means are provided for locking and retaining member 47 within the slot 46. More particularly a resilient detent 49 of the interior slot 46 juts out and abuts a flange-like portion 51 on retaining member 47.

Figure 6:
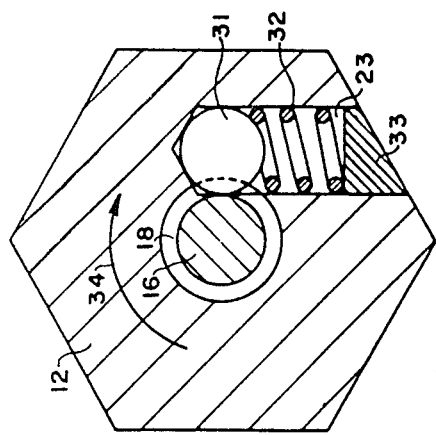
FIG. 6 is a pictorial showing of a key hole slotted retaining member of the embodiment of FIG. 5.

The retaining member as that seen in FIG. 6 has a key hole shaped aperture 52 therein. The aperture has an elongated portion 53 and a circular portion 54. Normally the elongated portion 53 fits within the notch 18 of the tool 16. This is the retained position. In the release position, which is obtained by pressure on the arcuate end 56 of retaining member 47 the notch portion 18 of tool 16 is aligned with the relatively large circular aperture 54, releasing the tool.

Thus, in each of the embodiments of the invention, the handle has retaining means internal thereto along with an internal spring for normally keeping the retaining means locked in the tool in place. Operation of the retaining means against the spring moves the retaining means to the release position and enables removing or replacing the tool in the handle. In certain of the embodiments the release position is obtained merely by rotating the tool relative to the handle in a given rotational direction.

While the principles of the invention have been described above in connection with specific apparatus and application, it is to be understood that this description is made by way of example only and not as a limitation on the scope of the invention.

What is claimed is:

1. A handle for a tool having a cylindrical shank with a peripheral notch therein, the handle comprising:
   an axial cylindrical aperture defined in said handle for accomodating said tool shank therein; and
   retaining means, substantially in said handle having a retaining position and a release position, for retaining said tool by engaging said notch, said retaining means being normally in said retaining position and switchable to said release position upon rotation of said handle with respect to said tool shank in a preselected direction with simultaneous application of an axial force thereto, said shank being rotatable in either of two opposite directions with respect to said handle when the shank is in the axial cylindrical aperture of said handle and said retaining means is in said retaining position.

2. A handle as recited in claim 1 wherein said tool is a deburring tool having a crank-like bent portion continuous to said shank, with a sharpened edge defining a blade thereat.

3. A handle as recited in claim 1 wherein said retaining means includes spring means and a ball element biased by said spring means for contact with the shank in said notch when the tool is in said handle, said element being rotatable and movable in a direction substantially transverse to the axial direction of said aperture to compress said spring means when said handle is rotated with respect to said tool shank in said preselected direction, and said axial force is applied to move said retaining means to said release position.

* * * * *